Nov. 21, 1950          B. C. EISENBERG          2,530,514
BUTTON SHANKING MACHINE

Filed Dec. 23, 1947          3 Sheets-Sheet 1

Inventor
BERNARD C. EISENBERG
By Maurice Block
Attorney

Nov. 21, 1950   B. C. EISENBERG   2,530,514
BUTTON SHANKING MACHINE
Filed Dec. 23, 1947   3 Sheets-Sheet 2
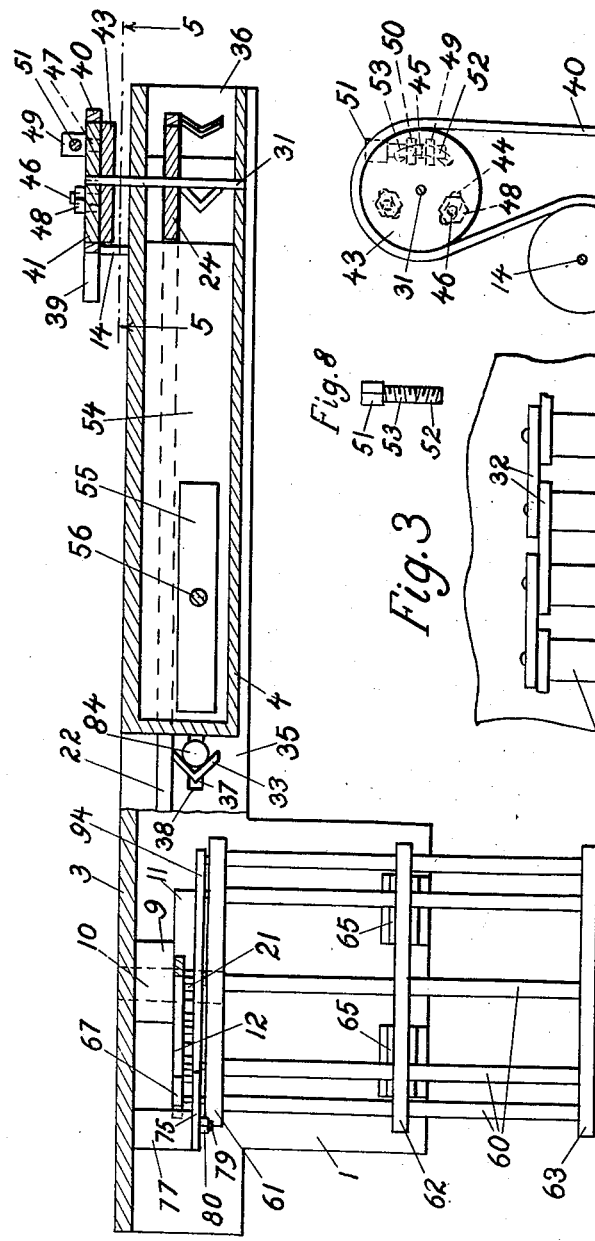
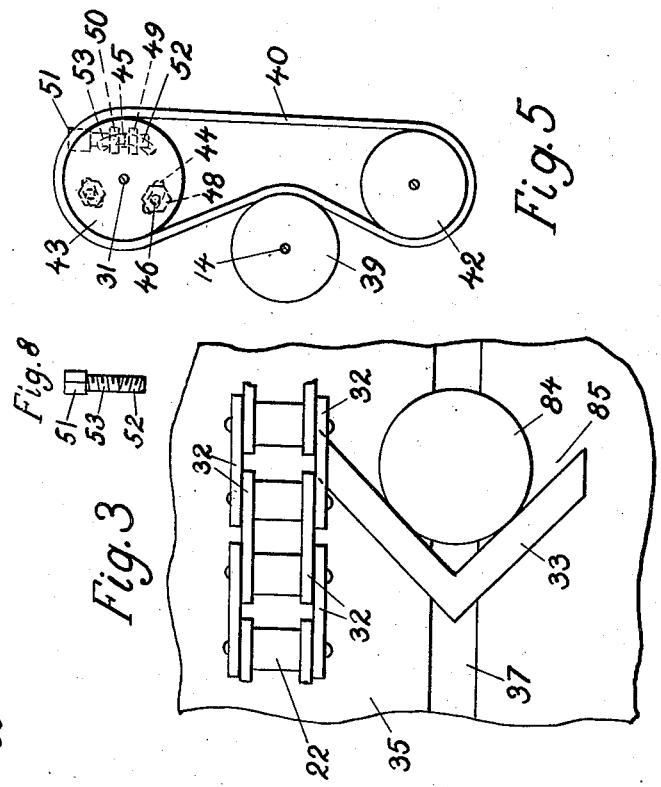
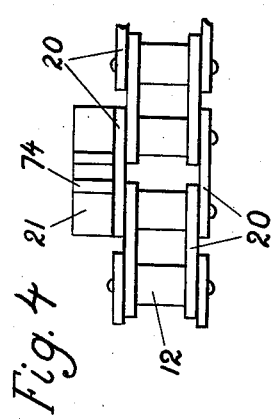
Inventor
BERNARD C. EISENBERG
By Maurice Block
Attorney Nov. 21, 1950     B. C. EISENBERG     2,530,514
BUTTON SHANKING MACHINE Filed Dec. 23, 1947     3 Sheets-Sheet 3

Inventor
BERNARD C. EISENBERG

Attorney

Patented Nov. 21, 1950

2,530,514

UNITED STATES PATENT OFFICE 2,530,514

BUTTON SHANKING MACHINE

Bernard C. Eisenberg, Brooklyn, N. Y.

Application December 23, 1947, Serial No. 793,346

13 Claims. (Cl. 79—2)

My invention relates to the manufacture of shanked buttons, and one of its objects is to provide a machine that carries out certain operations in this manufacture mechanically or automatically which have been carried out previously by hand.

Other objects are to save labor, to produce a large quantity of shanked buttons in a short time, and to provide all these buttons with accurately and uniformly shaped and positioned shanks.

Further objects are to provide a button shanking machine with one or several magazines for the insertion of prefabricated rods, to provide the machine with a knife cutting these rods into pieces forming shanks, to bring the cut shanks into contact with buttons, to make the contacting shanks stick to the buttons, and thereby, to produce shanked buttons.

Still other objects are to attain these results with simple and reliable means, and with means that can be easily made, assembled, operated and maintained, to provide a movable system of shank carriers and a movable system of button movers, to guide these movable systems so that the shank carriers transport the shanks over a way close to the way over which the button movers transport the buttons, to synchronize the movements of these two systems, and to press the shanks against the buttons while they are moving along these ways.

Still further objects are to provide a button shanking machine adapted for shanks of different shapes and sizes and for buttons of different diameters, to adjust the machine for buttons of different thicknesses, and to adjust the relative positions of the two movable systems so that each shank is pressed against the center of a button.

Still other objects and advantages will appear from the following description of an exemplifying embodiment of my invention from the appended claims and from the accompanying drawing in which:

Fig. 2 shows a cross-section of the same embodiment, taken along the broken line 2—2 in Fig. 1, some parts being represented non-sectionally.

Fig. 3 shows a top view of a detail of the same embodiment.

Fig. 4 shows a top view of another detail of the same embodiment.

Fig. 5 shows a cross-section taken along the line 5—5 in Fig. 2.

Fig. 8 shows a side view of a bolt used in this embodiment.

Figures 6, 7:
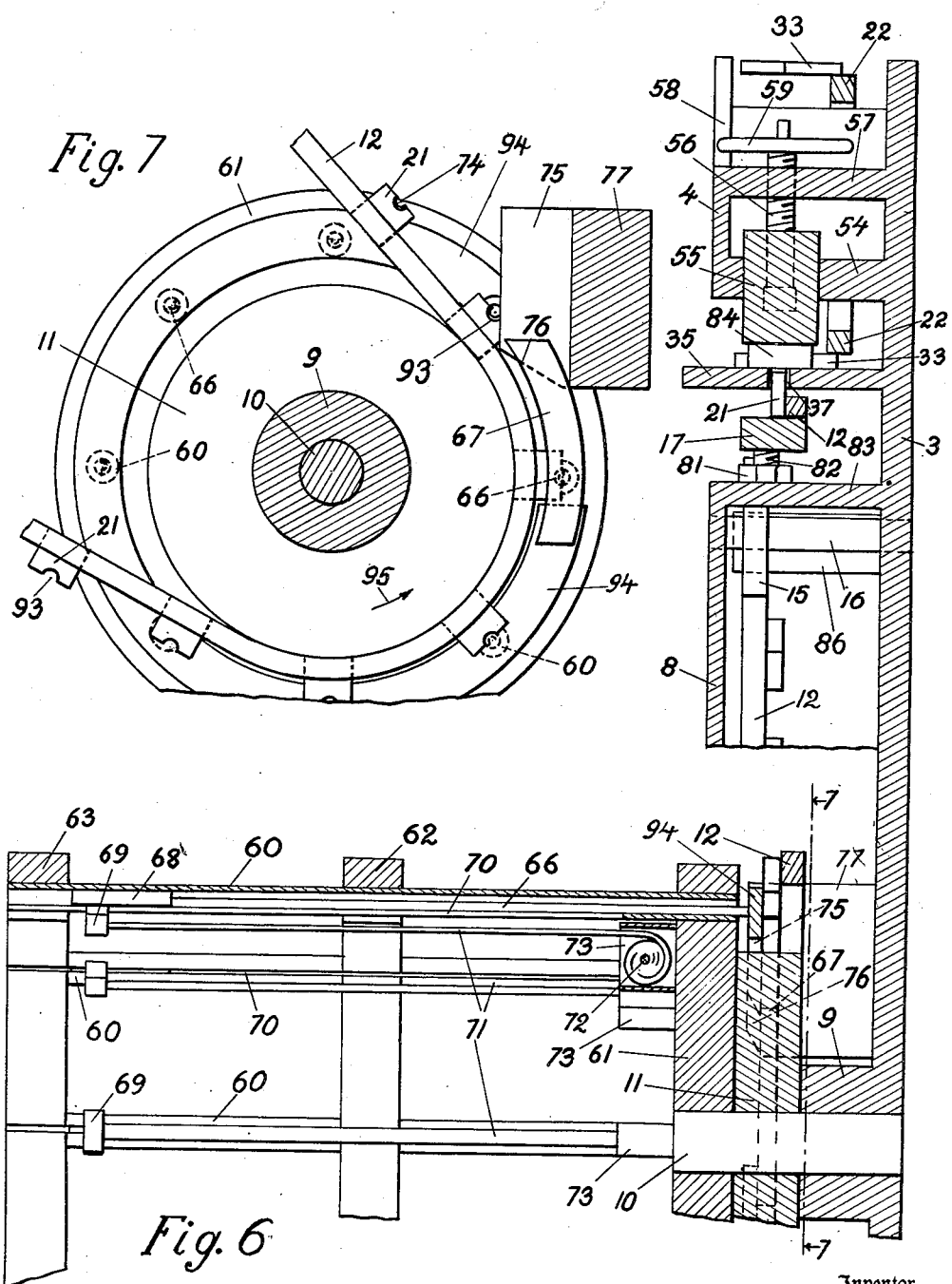
Fig. 6 shows a cross-section taken along the broken line 6—6 in Fig. 1, the lowermost part of the embodiment being broken off, some parts being represented non-sectionally.
Fig. 7 shows a cross-section taken along the line 7—7 in Fig. 6.

Figs. 3 and 4 are represented on about true scale. Figs. 6 and 7 are represented on a reduced scale. Figs. 1, 2, 5 and 6 are represented on a still more reduced scale. In the figures represented on reduced scales, some details are shown in simplified manner for the sake of clearer representation.

Referring to the drawings, numeral 1 indicates the base plate of a frame or housing which further comprises a back wall 3, front walls 4 and 8, and several cross-walls connecting the back wall 3 with either of the front walls. These cross-walls will be described later in connection with other parts.

A bearing 9 forming a front projection of the back wall 3 supports a rotatable shaft 10 to which a wheel 11 is affixed. An endless flexible element 12 engages the circumference of the wheel 11 and of a wheel 13 which has a shaft 14 rotatably supported in bores of the back wall 3 and of the front wall 8. The element 12 further runs over a wheel 15 having a shaft 16 supported in other bores of the same walls. Between the wheels 13 and 15, the element 12 runs over a track 17 which has an upper surface supporting the element 12. This surface has a horizontal part 18 and a part 19 sloping toward the wheel 15.

Preferably, the element 12 is constituted by a chain composed of links 20 (Fig. 4). Transport members or carriers 21 are affixed laterally to some of the links 20 and are distributed over the length of the element 12 at equal intervals.

Another endless flexible element 22 engages and connects two wheels 23 and 24. The wheel 23 is affixed to a shaft 25 which is rotatably supported in a bore of a block 26. This block is slidably guided in a window or opening 27 of the front wall 4 and can be adjusted by means of a hand wheel 30. This wheel is affixed to a screw bolt 28 passing through a threaded hole of a cross-wall 29 which extends between the back wall 3 and the front wall 4. The wheel 24 is affixed to a shaft 31 which is rotatably supported in bores of the front wall 4 and of the back wall 3 and extends beyond this back wall to the rear side.

The element 22 is preferably a chain (Fig. 3) composed of links 32 similar to the links 20 of the chain 12. Transport members 33 or fingers are affixed to some of the links 32, for example, to the lower sides of these links, and are distributed over the entire length of the chain 22 at equal intervals. The distance between corresponding ends of two subsequent members 33 is the same as the distance between corresponding ends of two subsequent members 21. The two systems of transport members are so positioned that each of the members 33 and 21 is positioned symmetrically with respect to the same vertical plane.

The element 22 runs from the wheel 23 to the wheel 24 in the direction of the arrow 34 (Fig. 1) over a table plate 35 at such a distance that the transport members 33 slide over this plate. The plate 35 forms a horizontal front extension of the back wall 3, has a broad recess 36 at its right end and has a narrow slot 37 extending parallel to the back wall from recess 36 as far as the left end 38 of the slot. The slot 37 runs along a central line positioned in the common plane of symmetry of the transport members 33 and 21. The slot is sufficiently broad to allow entrance of the upper parts of the members 21 into this slot, but is considerably narrower than the members 33.

The movable system comprising the members 21 and the movable system comprising the members 33 are so connected that both systems of transport members move at the same speed and in the same direction over the track 18. This may be done by a driving connection between the shafts 14 and 31 of the wheels 13 and 24. A wheel 39 is affixed to the rear end of the shaft 14 and is connected by an endless flexible element 40 similar to the elements 12 and 22 to a wheel 41 which is positioned on the shaft 31 and can be coupled with this shaft. The element 40 is so guided over another wheel 42 that the wheels 39 and 41, and consequently also the wheels 13 and 24, turn in opposite directions. The co-axial wheels 13 and 39 have equal diameters and the co-axial wheels 24 and 41 have equal diameters whereby the elements 12 and 22 move with the same speed which is equal to the speed of the element 40.

The relative longitudinal positions of transport members 12 and 22 running in parallel direction over the track 18 can be adjusted. For this purpose, the wheel 41 is not directly coupled with the shaft 31, but is adjustably coupled with a disk 43 affixed to the shaft 31. The wheel 41 has arc-shaped slots 44 and 45 through which bolts 46 and 47 affixed to the disk 43 pass. There may be two slots 44 and two bolts 46 provided with nuts 48. A plate 49 is affixed to the bolt 47 and is positioned beyond the rear side of the wheel 41. A similar plate 50 is connected to the wheel 41 and is positioned parallel to the plate 49. A bolt 51 (Fig. 8) has two threaded parts 52 and 53 screw-threaded in opposite directions, one engaging a threaded hole in the plate 49, and the other engaging a threaded hole in the plate 50.

When the bolt 51 is turned, the relative angular positions of the wheel 41 and of the disk 43 change whereby the positions of the chains 12 and 22 and of the transport members are adjusted. The wheel 41 is further secured to the disk 43 in any adjusted position by the nuts 48.

A cross-wall 54 extends horizontally at a distance over the table 35 from the back wall 3 to the front wall 4. A shoe 55 is vertically slidable in an opening of this cross-wall and can be adjusted by a bolt 56 anchored in a bore of the shoe 55 and having a threaded part passing through a correspondingly threaded hole of a bridge 57 spanning from the back wall 3 to the front wall 4 and forming the bottom of a recess 58 accessible from the front of the housing. The upper end of the bolt 56 is provided with a hand wheel 59.

A feeding device or magazine comprises a plurality of tubes 60 passing through holes of a disk 61. These holes are distributed at equal intervals over a circle of the disk 61. The peripheral distance between the centers of two subsequent tubes 60 is equal to the step from one member 21 to the subsequent member 21. The tubes 60 pass further through two rings 62 and 63 which are co-axial with the disk 61 and may be supported, for example, by rollers 64 rotatably carried by brackets 65 affixed to the base plate 1. The rollers 64 contact the lower side of the rim of the ring 62. The disk 61 is affixed to the shaft 10 or to the wheel 11 and rotates together with these parts.

The tubes 60 form magazines for the insertion of elongated rods 66 of uniform cross-sections so shaped that a cut portion of a rod 66 forms a button shank. Each of these magazines circulates, that is, it returns periodically to the same position. Means are provided to urge the inserted rods 66 to the right side in Fig. 6. A stop gauge 67 is stationarily positioned in a plane parallel to the disk 61 and is located at that side of the moving plane of the members 21 which is opposite to the disk 61. The stop gauge 67 extends over an arc of a circle around the shaft 10. This circle has the same diameter as the circle in which the tubes 60 are arranged.

The urging means for each rod 66 may comprise a piston-like member 68 slidable in one of the tubes 60, a stem 69 shaped like a T, the leg of this T passing through a slot 70 in the inner side of the respective tube 60 and being affixed to the piston 68, and a tape-shaped spring 71 having one end affixed to the stem 69. The other end of the spring 71 is affixed to a shaft 72 carried in bores of a little casing 73 affixed to the disk 61. The springs 71 are of the so-called clock type which tend to coil up. In the shown condition, the pistons 68 are near the left ends of the tubes 60 in Fig. 6, and parts of the springs 71 are unwound from their shafts 72 whereby the pistons press the rods 66 to the right side.

Each member 21 forms a carrier adapted to carry a cut piece 74 of a rod 66. That side of each carrier 21 which is the upper side when the carrier runs over the track 17 is provided with a recess or groove 93 adapted to support such a cut piece. The chain 12 is so positioned and adjusted that the recess 93 of each carrier is in line with the opening of one of the tubes 60 or with one of the rods 66 when this carrier runs on the circumference of the wheel 11. During the larger part of the alined rotation of the rods and the carriers, the rods 66 are prevented from entering the recesses 93 by a stop ring 94 positioned between the disk 61 and that plane in which the members 21 move. The stop ring 94 has a gap position in front of the stop gauge 67. This gap allows the entrance of the end of a rod 66 as soon as this end, rotating in the direction of the arrow 95 in Fig. 7, reaches the gap. Shortly thereafter, this end is cut while carried by a member 21 and stopped by the gauge 67.

This cutting operation is performed by a knife 75 having a cutting edge 76 positioned in the path of the rods 66 just in front of the members 21. The knife may be adjustably affixed to a stationary part, for example, to a projection 77 of the back wall 3. The knife may have a slot 78 through which screw bolts 79 pass which are affixed to the projection 77 and are provided with nuts 80. The stop ring 94 is positioned in the same plane as the knife 75 and forms a continuation of this knife in the direction of the disk's 61 rotation. The gap of the ring 94 is positioned, in this direction, before the knife. The stop ring 94 is affixed to a stationary part, for example, to the knife 75. The stop gauge 67 is also stationary and may be affixed to the stop ring 94.

The shanks formed by the pieces 74 are carried by the members 21 over the track 17. The height of the surface 18 is so adjusted that the shanks running in the slot 37 of the table 35 reach through this slot to the upper side of the table. The track 17 can be adjusted by nuts 81 engaging bolts 82 which are affixed to the track 17 and are supported by a crosswall 83 connecting the back wall 3 with the front wall 8.

While the transport members 33 move from the wheel 23 toward the shoe 55, plate-shaped buttons 84 are placed on the table 35 in the moving direction before the transport members 33. These members have V-shaped recesses 85 (Fig. 3) for the reception of the buttons 84 whereby these buttons are automatically so adjusted that their centers move over the slot 37.

Either the upper surfaces of the shanks 74 or the lower surfaces of the buttons 84 or both are made adhesive before they reach the area over the track 17. This is done by moistening these surfaces with a suitable liquid stored in a receptacle 86. This receptacle may be affixed to a stationary part, for example, to the back wall 3. A wick 87 reaches from the receptacle 86 through a supporting tube 88 and has a free end positioned in the path of the lower surfaces of the plates 84. Another wick 89 reaches from the receptacle 86 through a supporting tube 90 into the path of the upper surfaces of the shanks 74 while these shanks move in the direction of the arrow 91 (Fig. 1) toward the wheel 15.

The system comprising the fingers 33, the system comprising the carriers 21 and the magazine comprising the tubes 60 form three movable devices of which the movements are co-ordinated. Preferably, two of these devices derive motion from the motion of the third device. For example, any one of the shafts 14, 25 and 31 may be driven by motor means of any well known type. The remaining shafts described derive motion from the driven shaft by means of the chains or flexible elements 12, 22 and 40.

Before the motor drive is started, the machine is adjusted for a particular size of buttons. The shoe 55 is lowered by turning the wheel 59 until the shoe contacts the upper surface of a button placed under the shoe on the table 35. The longitudinal position of the system of fingers 33 is adjusted by means of the bolt 51 in the manner described until the center of a button positioned in the recess 85 of a finger 33 is positioned vertically over the center of a groove 93 of a carrier 21. The track 17 is adjusted by means of the nuts 81 until a shank positioned in this groove contacts the lower surface of a button placed on the table 35.

The tubes 60 are filled with rods 66 while the pistons 68 are temporarily removed from the tubes through the front openings of the same. After the pistons are inserted again in the tubes, the rods 66 are urged backwardly until they are stopped either by the stop ring 94 or by the stop gauge 67.

The receptacle 86 is filled with a suitable liquid. For example, if the buttons or the shank or both consist of plastics soluble in acetone, the receptacle 86 may be filled with acetone. A small quantity of acetone applied to the surface of such plastics makes this surface adhesive.

Then, the drive of the machine is started. During the operation, plate-shaped buttons 84 are placed before the fingers 33 on the table 35 while these fingers move toward the shoe 55. When one of these buttons 84 reaches the area under the shoe 55, it meets a shank 74 which is carried by a member 21 supported by the surface 18 of the track 17. The button plate and shank run farther along the slot 37 in centrally contacting positions whereby the adhesive surfaces of the button parts 84 and 74 are bound and will stick permanently.

Figure 1:
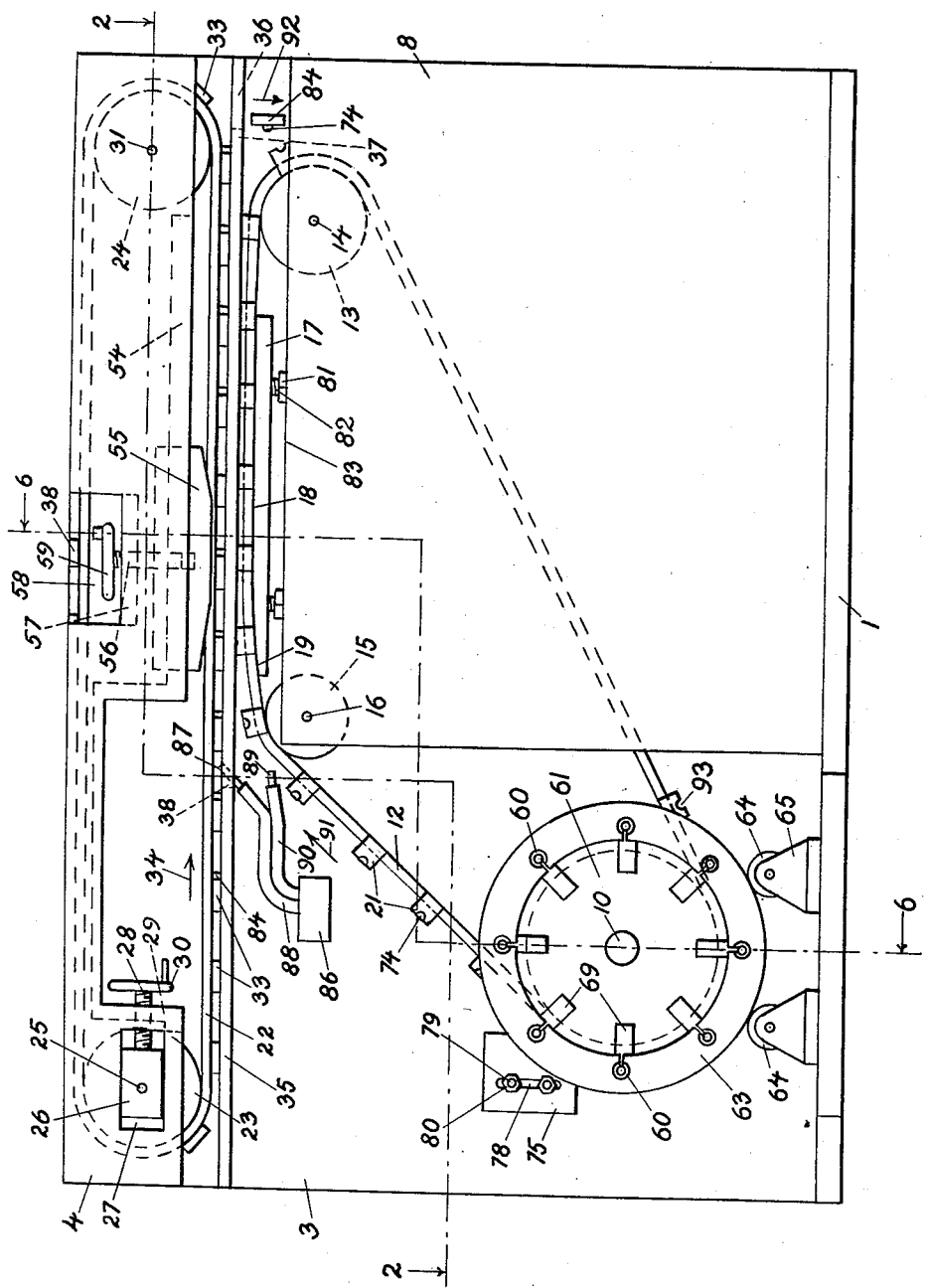
Fig. 1 shows a front view of an illustrative embodiment of my invention.

The shanked buttons made in this manner are transported by fingers 33 to the end of the slot 37 and, then, drop down through the recess 36 in the direction of the arrow 92 in Fig. 1. The dropping shanked buttons may be received in a suitable basket or the like receptacle of well known nature.

I desire it understood that my invention is not confined to the particular embodiment shown and described, the same being merely illustrative, and that my invention may be carried out in other ways without departing from the spirit of my invention as it is obvious that the particular embodiment shown and described is only one of the many that may be employed to attain the objects of my invention.

Having described the nature of my invention, what I claim and desire to protect by Letters Patent is:

1. A button shanking machine comprising a movable system of transport members adapted to move buttons in a definite direction, a movable system of carriers adapted to support shanks, means to move said systems continuously, said systems being so guided that they move said buttons and shanks along paths converging toward parallel path stretches having such a distance that a surface of each of said shanks contacts a surface of one of said buttons, and means to make one of said contacting surfaces adhesive before said surfaces contact each other.

2. A button shanking machine comprising a movable system of transport members adapted to move buttons in a definite direction, a circulating magazine adapted to carry a rod, a knife positioned in the path of an end of said rod whereby a piece of said rod is cut off whenever said end meets said knife, a movable system of carriers each being adapted to support one of said pieces, said carrier system being so guided that said carriers receive said pieces when they are cut and, then, carry the pieces along a way substantially parallel to said direction at such a distance from said buttons that a surface of each of said pieces contacts a surface of a different one of each of said buttons, and means to make one of said surfaces adhesive before said surfaces contact each other.

3. A button shanking machine comprising a table with a slot passing vertically through said table, a movable element, a series of fingers affixed to said element, said element being so guided that said fingers slide on said table over said slot whereby said fingers are adapted to shift buttons placed on said table along and over said slot, a movable system of carriers adapted to move shanks along said slot at such a distance from said buttons that a surface of each of said shanks contacts a surface of a different one of each of said buttons, and means to make one of said contacting surfaces adhesive before said surfaces contact each other.

4. A button shanking machine comprising a table with a slot passing vertically through said table, a movable element, a series of fingers affixed to said element, said element being so guided that said fingers slide on said table over said slot whereby said fingers are adapted to shift buttons placed on said table along and over said slot, said fingers having recesses shaped like horizontally lying V's adapted for the insertion of said buttons, a movable system of carriers adapted to move shanks along said slot at such a distance from said buttons that a surface of each of said shanks contacts a surface of a different one of each of said buttons, and means to make one of said contacting surfaces adhesive before said surfaces contact each other.

5. A button shanking machine comprising a table with a slot passing vertically through said table, a movable element, a series of fingers affixed to said element, said element being so guided that said fingers slide on said table over said slot whereby said fingers are adapted to shift buttons placed on said table along and over said slot, a shoe positioned vertically over said slot at an adjustable distance from said table, a movable system of carriers adapted to move shanks along said slot at such a distance from said buttons that a surface of each of said shanks contacts a surface of a different one of each of said buttons, and means to make one of said contacting surfaces adhesive before said surfaces contact each other.

6. A button shanking machine comprising a movable endless flexible element, a series of transport members affixed to said element at equal intervals and adapted to move buttons in a definite direction, another movable endless flexible element, a series of shank-supporting carriers affixed to said other element at intervals equal to the intervals of said transport members, said other element being so guided that said carriers can move shanks over a way obliquely approaching the path of said buttons and then over a stretch substantially parallel to said direction at such a distance from said buttons that a surface of each of said shanks contacts a surface of a different one of each of said buttons, means to make one of said contacting surfaces adhesive before said surfaces contact each other, and driving means connecting said two elements so that these elements move at the same speed.

7. A button shanking machine comprising a movable endless flexible element, a series of transport members affixed to said element at equal intervals and adapted to move buttons in a definite direction, another movable endless flexible element, a series of shank-supporting carriers affixed to said other element at intervals equal to the intervals of said transport members, said other element being so guided that said carriers can move shanks over a way obliquely approaching the path of said buttons and then over a stretch substantially parallel to said direction at such a distance from said buttons that a surface of each of said shanks contacts a surface of a different one of each of said buttons, means to make one of said contacting surfaces adhesive before said surfaces contact each other, one of said elements deriving motion from the other element at the transmission ratio one to one, and means to adjust the longitudinal position of one of said elements relatively to the other element.

8. A button shanking machine comprising a movable endless flexible element, a series of transport members affixed to said element at equal intervals and adapted to move buttons in a definite direction, another movable endless flexible element, a series of shank-supporting carriers affixed to said other element at intervals equal to the intervals of said transport members, said other element being so guided that said carriers can move shanks over a way obliquely approaching the path of said buttons and then over a stretch substantially parallel to said direction at such a distance from said buttons that a surface of each of said shanks contacts a surface of a different one of each of said buttons, means to make one of said contacting surfaces adhesive before said surfaces contact each other, one of said elements deriving motion from the other element at the transmission ratio one to one, and means to adjust the longitudinal position of one of said elements relatively to the other element, said latter means comprising a wheel rotating when one of said elements moves and a disk coaxial with said wheel and rotating when the other element moves, said wheel and said disk being connectable in various relative angular positions.

9. A button shanking machine comprising a movable system of transport members adapted to move buttons in a definite direction, a movable system of carriers adapted to support shanks, means to move said systems continuously, said systems being so guided that they move said buttons and shanks along paths converging toward parallel path stretches having such a distance that a surface of each of said shanks contacts a surface of one of said buttons, a stationary track supporting said carriers while they move parallel to said buttons, said track having an adjustable distance from the moving line of said buttons, and means to make a different one of each of said contacting surfaces adhesive before said surfaces contact each other.

10. A button shanking machine comprising a movable system of transport members adapted to move buttons in a definite direction, a rotatable magazine comprising tubes arranged at equal distances from the axis of rotation of said magazine, extending parallel to said axis and being adapted to carry rods having ends projecting beyond said tubes, a knife positioned in the path of said ends whereby a piece is cut off each rod meeting said knife, a movable system of carriers each being adapted to support one of said pieces, said carrier system being so guided that said carriers receive said pieces when they are cut and, then, carry the pieces along a way substantially parallel to said direction at such a distance from said buttons that a surface of each of said pieces contacts a surface of a different one of each of said buttons, and means to make one of said surfaces adhesive before said surfaces contact each other.

11. A button shanking machine comprising a movable system of transport members adapted to move buttons in a definite direction, a circulating magazine adapted to carry a rod, means urging said rod into a position in which an end of said rod projects beyond said magazine, a stop gauge limiting the projection of said end, a knife positioned between said magazine and said stop gauge in the path of said end whereby a piece of predetermined length is cut off said rod whenever said end meets said knife, a movable system of carriers each being adapted to support one of said pieces, said carrier system being so guided that said carriers receive said pieces when they are cut and, then, carry the pieces along a way substantially parallel to said direction at such a distance from said buttons that a surface of each of said pieces contacts a surface of a different one of each of said buttons, and means to make one of said surfaces adhesive before said surfaces contact each other.

12. A button shanking machine comprising a movable system of transport members adapted to move buttons in a definite direction, a circulating magazine adapted to carry a rod, means urging said rod into a position in which an end of said rod projects beyond said magazine, a stop gauge limiting the projection of said end, a knife positioned between said magazine and said stop gauge in the path of said end whereby a piece of predetermined length is cut off said rod whenever said end meets said knife, a stop ring positioned in the plane of said knife along the circulating path of said rod, said stop ring having a gap positioned, in the direction of said rod, before said stop gauge and positioned, in the direction of circulation, before said knife whereby said rod is prevented from projecting beyond said knife, except at the time when said rod is in line with said gap, a movable system of carriers each being adapted to support one of said pieces, said carrier system being so guided that said carriers receive said pieces when they are cut and, then, carry the pieces along a way substantially parallel to said direction at such a distance from said buttons that a surface of each of said pieces contacts a surface of a different one of each of said buttons, and means to make one of said surfaces adhesive before said surfaces contact each other.

13. A button shanking machine comprising a movable system of transport members adapted to move buttons in a definite direction, a circulating magazine adapted to carry a rod, a knife positioned in the path of an end of said rod whereby a piece of said rod is cut off whenever said end meets said knife, a movable system of carriers each being adapted to support one of said pieces, said carrier system being so guided that said carriers receive said pieces when they are cut and, then, carry the pieces along a way substantially parallel to said direction at such a distance from said buttons that a surface of each of said pieces contacts a surface of a different one of each of said buttons, and means to make one of said surfaces adhesive before said surfaces contact each other, said two systems and said magazine forming three movable devices of which two derive motion from the third device.

BERNARD C. EISENBERG.

REFERENCES CITED

The following references are of record in the file of this patent:

UNITED STATES PATENTS

| Number | Name | Date |
|---|---|---|
| 1,059,268 | Bond | Apr. 15, 1913 |
| 1,574,913 | McManus | Mar. 2, 1926 |
| 1,735,609 | Frederick | Nov. 12, 1929 |
| 2,196,288 | Bender | Apr. 9, 1940 |
| 2,197,714 | Schmidt | Apr. 16, 1940 |